United States Patent [19]

Struck et al.

[11] Patent Number: 4,561,843
[45] Date of Patent: Dec. 31, 1985

[54] TRANSFER FLUE WITH MEANS FOR IMPROVING THE FLOW OF GASES

[75] Inventors: Carl-Heinz Struck, Bochum; Ralf Schumacher, Hagen; Ingomar Kohler, Mulheim; Gerd-Ullrich Leppert, Iserlohn, all of Fed. Rep. of Germany

[73] Assignee: Dr. C. Otto & Comp. G.m.b.H., Bochum, Fed. Rep. of Germany

[21] Appl. No.: 616,051

[22] Filed: Jun. 1, 1984

[30] Foreign Application Priority Data

Jun. 7, 1983 [DE] Fed. Rep. of Germany ....... 3320485

[51] Int. Cl.⁴ .............................................. F24N 7/00
[52] U.S. Cl. .................................... 432/214; 165/9.1; 202/140
[58] Field of Search ................................. 202/140–144, 202/146; 432/180–182, 214; 165/9.1; 431/170

[56] References Cited

U.S. PATENT DOCUMENTS

| 2,232,121 | 2/1941 | Linder | 432/214 |
| 4,150,717 | 4/1979 | Balke et al. | 165/9.1 |
| 4,392,824 | 7/1983 | Struck et al. | 432/180 |
| 4,435,152 | 3/1984 | Struck et al. | 431/170 |

Primary Examiner—Carroll B. Dority, Jr.
Attorney, Agent, or Firm—Thomas H. Murray; Clifford A. Poff

[57] ABSTRACT

A refractory brick is installed in a transfer flue with vertical orifices disposed between, on the one hand, the regenerators or recuperators and, on the other hand, the combustion chambers of industrial gas-fired systems, particularly a coke oven. The refractory brick has parallel surfaces and the length of the orifices in the brick is at least six times their diameter. The sum of the cross-sectional areas of the orifices is from 0.75 to 1.5 times the flow cross section of the upwardly-inclined portion of the transfer flue. The cross sections of the orifices can be cylindrical or elliptical. The orifices can be longitudinal slots whose cross-sectional areas are bounded by semicircles and whose cross-sectional length is not greater than three times the diameter of the semicircles.

8 Claims, 5 Drawing Figures

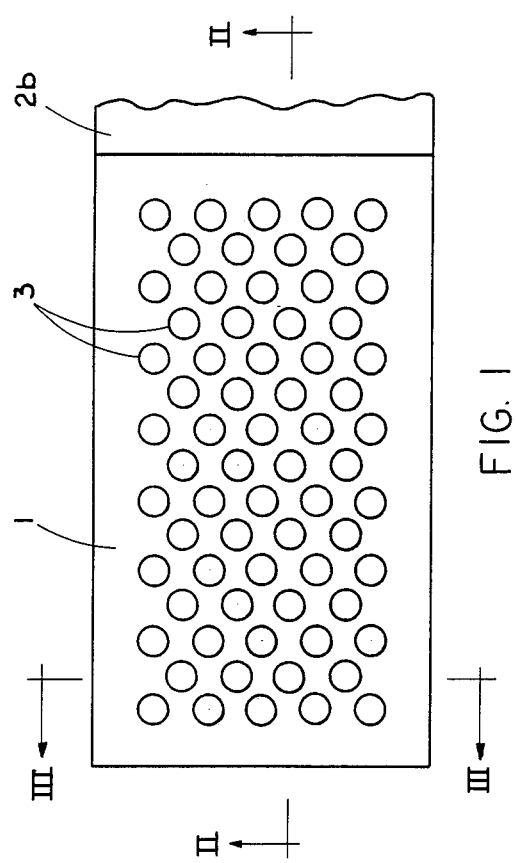
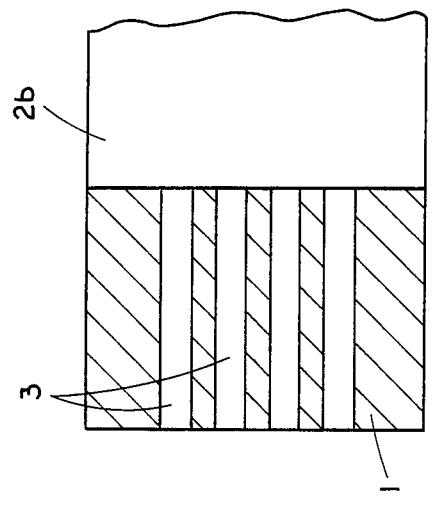
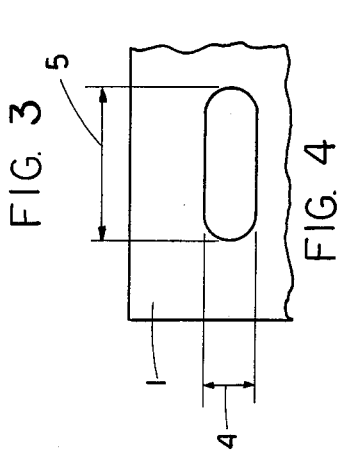
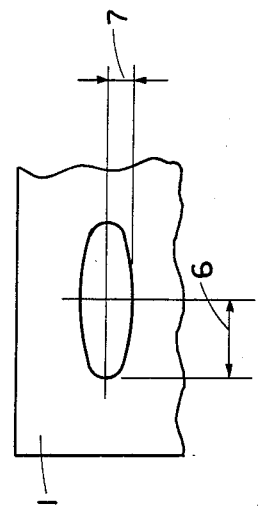
FIG. 3
FIG. 4
FIG. 5
FIG. 1
FIG. 2

4,561,843

TRANSFER FLUE WITH MEANS FOR IMPROVING THE FLOW OF GASES

BACKGROUND OF THE INVENTION

This invention relates to means for improving the flow of combustion-supporting media in transfer flues extending between, on one hand, the regenerators or recuperators and, on the other hand, the combustion chambers of industrial gas-fired systems having provisions for the recovery of heat from the combustion gases by means of regenerators or recuperators. More particularly, the present invention relates to coke ovens having flues receiving combustion-supporting media, such as air in the case of rich-gas heating operations or air and lean gas in the case of lean-gas heating operations in which the flow of the media from a heat exchanger into the heating flue passes through vertical orifices disposed in a rectangular refractory brick located in a vertical portion of a transfer flue which extends to the heating flue sole and having a correspondingly increased diameter. The refractory brick includes vertical side surfaces engaged with the inside walls of the transfer flue and the vertical orifices of the brick have cross-sectional areas, the sum of which is from 0.75 to 1.5 times, preferably from 0.9 to 1.15 times, the flow cross section of the transfer flue at an upwardly-inclined part thereof disposed before the vertical portion with respect to the flow direction of the combustion media.

In U.S. Pat. No. 4,392,824, there is disclosed a wedge-shaped refractory brick having at least one oblique surface and cylindrical bores that extend vertically when the brick is inserted into a vertical portion of a duct at the bottom of a heating flue. This part of the duct has an increased diameter to support the brick such that the vertical sides abut the inner duct walls and the bottom oblique surface extends toward the mouth of an obliquely-rising portion of the duct. The sum of the cross-sectional areas of the cylindrical bores in the brick is from 0.75 to 1.5 times the flow cross section of the obliquely-rising duct portion. The cross-sectional area of the top of the wedge-shaped brick which is coplanar with the flue base is in a range of between 20 and 200 with the cross section of the cylindrical bore in the brick. The diameter of each bore in the brick is between 10 and 60 millimeters. A ratio of 0.3:1.5 is formed between an acute angle between the oblique bottom surface and the horizontal and an angle between the obliquely-rising duct portion and the horizontal. The top surface of the brick may also be oblique and parallel with the bottom surface whereby the brick has the shape of a rhomboid.

Disclosed in U.S. Pat. No. 4,435,152 is a flow plate to replace the base in a heating flue for a coke oven. The thickness of the flow plate is greater than the thickness of the flue base and disposed above a chamber which is divided into two halves in a gas-tight manner by a central web of refractory material. Each chamber communicates with ducts that feed preheated air from the regenerators during rich-gas firing and feed preheated air and lean gas during firing with lean gas. The height of the chamber to the thickness of the flow plate is a ratio within 0.3:0.7. The flow plate has a plurality of bores each with a cross-sectional area which, when compared with the cross-sectional area of the plate, forms a ratio of between 20 and 200. The diameter of the cylindrical bore is within 10 and 60 millimeters.

SUMMARY OF THE INVENTION

It is an object of the present invention to simplify the shape of a refractory brick having vertical orifices and fitting the brick to align the flow of combustion media in a transfer flue.

According to the present invention, there is provided in the vertical part of a transfer flue having an upwardly-inclined part extending to the vertical flue part disposed between a heat-storage means and a combustion chamber and through which preheated combustion-supporting media flow, a refractory brick having rectangular side walls disposed in a vertical portion of the transfer flue, vertical orifices extending through the brick with the sum of the cross-sectional areas of the orifices being from 0.75 to 1.5 times the cross-sectional area of the upwardly-inclined part of the transfer flue and a ratio of greater than 6:1 between the length-to-diameter of the orifices.

It has been surprisingly discovered by flow experiments conducted for practical testing of the flow of media through orifices in such bricks that a wedge-shaped feature of the brick of the type discussed above is unnecessary and that a plane, parallel brick according to the present invention can provide the same aligning effect for the combustion media, e.g., air or air and lean gas, entering the heating flue if the length-to-diameter ratio of the orifices is greater than 6:1 and is preferably a ratio of 8 up to 12:1. The orifices can be circular bores in cross section. In this event, the diameter of the cylindrical bores is between 10 and 60 millimeters, preferably between 20 and 50 millimeters.

It has also been discovered that flow conditions for the flow of media are not impaired if, instead of forming cylindrical bores in the brick slots are formed having a cross-sectional surface bounded by semicircles and that the cross-sectional length of each slot is greater than 3 times the diameter of the semicircles. The orifices can have a cross-sectional configuration that is elliptical with the ratio of the length of the longer half-axis passing through the center to the length of the shorter half-axis passing through the center not greater than 3:1.

The refractory brick embodying the features of the present invention has been found to perform in the same manner as the brick embodying the features disclosed in U.S. Pat. No. 4,392,824 and provides a considerable improvement productive to the flow of media. The production of bricks and the fitting of them into the transfer flues is considerably simplified and can be performed at reasonable cost without problems.

These features and advantages of the present invention as well as others will be more fully understood when the following description is read in light of the accompanying drawings, in which:

FIG. 1 is a plan view illustrating a refractory brick according to the present invention in a transfer flue;

FIG. 2 is a sectional view taken along line II—II of FIG. 1;

FIG. 3 is a sectional view taken along line III—III of FIG. 1;

FIG. 4 is an enlarged fragmentary view of a brick embodying vertical orifices according to a second embodiment of the present invention; and FIG. 5 is an enlarged fragmentary view similar to FIG. 4 but illustrating a third embodiment of vertical orifices in a brick.

According to the embodiment of the present invention illustrated in FIGS. 1-3, a brick 1 is in the shape of a parallelepiped. The brick is installed in a vertical portion 2a of a transfer flue. The vertical portion 2a is disposed after, i.e., downstream, of an upwardly-inclined flue portion 2b. In the embodiment illustrated in FIGS. 1-3, the brick 1 is provided with an array of orifices 3 that have the form of bores that are circular in cross section. The length of each bore is about eight times the diameter of the bore. The bore diameter is preferably 25 millimeters when a bore length of 200 millimeters is provided. The sum of the cross-sectional areas of the vertical orifices provided in the brick is between 0.75 and 1.5 times the cross-sectional area of the inclined flue portion 2b. Preferably, the sum of the cross-sectional areas of the orifices is from 0.9 to 1.15 times the cross-sectional area of the inclined flue portion 2b. At the same time, a ratio greater than 6:1 exists between the length-to-diameter of the orifices. Preferably, this ratio is between 8:1 and 12:1. The cylindrical bores may be between 10 and 60 millimeters, preferably between 20 and 50 millimeters in diameter.

In FIG. 4, a further embodiment of bricks is illustrated in which only the configuration of the orifices differs from that described above in regard to the embodiment of FIGS. 1-3. In FIG. 4, each vertical orifice in the brick is a slot having a semicircular shape in cross section. The overall length of the slot having semicircular ends is denoted by reference numeral 5. This length is less than 3 times the diameter of the semicircle which is denoted by the reference numeral 4.

In FIG. 5, a further embodiment of bricks with vertical orifices is illustrated in which the orifices are elliptical in cross section. Each ellipse has a ratio of less than 3:1 between the length of a half-axis along the abscissa, identified by the reference numeral 6 in FIG. 5 to the length of a half-axis along the ordinate of the ellipse which is identified by the reference numeral 7 in FIG. 5.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a transfer flue having a vertical flue part downstream of an upwardly-inclined flue part disposed between a heat-storage means and a combustion chamber and through which preheated combustion-supporting media flow, a refractory brick having rectangular side walls disposed in said vertical flue part of said transfer flue, vertical orifices extending through said brick with the sum of the cross-sectional areas of the orifices being from 0.75 to 1.5 times the cross-sectional area of said upwardly-inclined flue part of the transfer flue, and a ratio of greater than 6:1 between the length-to-diameter of the orifices.

2. The transfer flue according to claim 1 wherein said sum of the cross-sectional areas of the orifices is from 0.9 to 1.15 times the cross-sectional area of said upwardly-inclined flue part of the transfer flue.

3. The transfer flue according to claim 1 wherein said ratio of the length-to-diameter of the orifices is between 8:1 and 12:1.

4. The transfer flue according to claim 1 wherein said vertical orifices comprise bores having circular cross sections.

5. The transfer flue according to claim 4 wherein said bores are each cylindrical and have a diameter of between 10 and 60 millimeters.

6. The transfer flue according to claim 4 wherein said bores are each cylindrical and have a diameter of between 20 and 50 millimeters.

7. The transfer flue according to claim 1 wherein said vertical orifices comprise slots each having semicircular ends with an overall length less than three times the diameter of the semicircle.

8. The transfer flue according to claim 1 wherein said vertical orifices are elliptical in cross section with each ellipse having a ratio of less than 3:1 between the length of a half-axis along the abscissa of the ellipse to the length of a half-axis along the ordinate of the ellipse.

* * * * *